US009045605B2

(12) United States Patent
Shutt (10) Patent No.: US 9,045,605 B2
(45) Date of Patent: Jun. 2, 2015

(54) DEDUSTED FIRE-RETARDANT CELLULOSE MATERIAL

(75) Inventor: Thomas C. Shutt, Milwaukee, WI (US)

(73) Assignee: Nature Tech LLC, Milwaukee, WI (US)

( * ) Notice: Subject to any disclaimer, the term of this patent is extended or adjusted under 35 U.S.C. 154(b) by 1116 days.

(21) Appl. No.: 12/572,528

(22) Filed: Oct. 2, 2009

(65) Prior Publication Data

US 2010/0086780 A1     Apr. 8, 2010

Related U.S. Application Data

(60) Provisional application No. 61/102,463, filed on Oct. 3, 2008.

(51) Int. Cl.

| | | |
|---|---|---|
| B05D 3/12 | (2006.01) | |
| C08J 3/20 | (2006.01) | |
| D04H 1/42 | (2012.01) | |
| D21H 21/34 | (2006.01) | |
| B05D 3/02 | (2006.01) | |
| B05D 3/04 | (2006.01) | |
| C08K 3/30 | (2006.01) | |
| C08K 3/32 | (2006.01) | |
| C08K 3/38 | (2006.01) | |

(52) U.S. Cl.
CPC ............ *C08J 3/203* (2013.01); *Y10T 428/2965* (2015.01); *C08K 3/30* (2013.01); *C08K 3/32* (2013.01); *C08K 3/38* (2013.01); *D04H 1/42* (2013.01); *D21H 21/34* (2013.01)

(58) Field of Classification Search
CPC ....... D21H 21/34; D21H 23/50; D21B 1/021; D21B 1/04; D21B 1/06; D21B 1/08
USPC .................. 427/427, 377, 378, 289
See application file for complete search history.

(56) References Cited

U.S. PATENT DOCUMENTS

| | | | |
|---|---|---|---|
| 4,168,175 A | 9/1979 | Shutt | |
| 4,174,223 A | 11/1979 | Steen | |
| 4,191,224 A | 3/1980 | Bontrager et al. | |
| 4,203,755 A * | 5/1980 | Ruckstuhl | ........................... 71/9 |
| 4,228,964 A * | 10/1980 | Brady | ........................ 241/186.3 |
| 4,572,815 A | 2/1986 | Kaiser | |
| 4,595,414 A | 6/1986 | Shutt | |

(Continued)

OTHER PUBLICATIONS

International Application No. PCT/US2009/059398; PCT Notification of Transmittal of the International Search Report and the Written Opinion of the International Searching Authority; Jan. 29, 2010; 9 pages.

(Continued)

*Primary Examiner* — Kelly M Gambetta
(74) *Attorney, Agent, or Firm* — Whyte Hirschboeck Dudek S.C.

(57) ABSTRACT

A method of producing a low-dust, fire retardant cellulose fiber material useful in producing insulation and other such products is provided. A liquid, comprising a solvent and at least one fire-retarding material soluble in that solvent, is applied to a cellulose source material, and the liquid is allowed to permeate into the cellulose source material. The liquid permeated material is dried to remove the solvent while the fire-retardant material remains in the cellulose source material. The dried fire-retardant cellulose source material is reduced in size and then de-dusted to produce a low to no dust, fire-retardant cellulose fiber material that has functionally equivalent fire-retardant properties as the dried fire-retardant cellulose source material before de-dusting.

14 Claims, 3 Drawing Sheets

(56) References Cited

U.S. PATENT DOCUMENTS

| | | | |
|---|---|---|---|
| 4,970,950 A | | 11/1990 | Ahoste |
| 5,366,095 A | | 11/1994 | Martin |
| 5,534,301 A | * | 7/1996 | Shutt .......................... 427/377 |
| 5,642,601 A | | 7/1997 | Thompson, Jr. et al. |
| 6,155,020 A | | 12/2000 | Deem |
| 6,578,782 B2 | | 6/2003 | Elliot, Jr. et al. |

OTHER PUBLICATIONS

VORTI-SIV, a Division of MM Industries, Inc.; Gyratory Sieves, http://www.vorti-siv.com; 1997-2005; 1 page.

Dust Collection & Vacuum Systems, Ryvac Engineering Company, http://www.ryvac.com; 2002; 1 page.

Bill's Cyclone Dust Collection Research—Homemade muffler; http://billpentz.com/woodworking/cyclone/mufflerbelliveau.cfm;

Homemade muffler by Dave Belliveau, Building a DC muffler; 2005-2008; 11 pages.

Breum, N.O. et al; Cellulosic building insulation versus mineral wool, fiberglass or perlite: Installer's exposure by inhalation of fibers, dust, endotoxin and fire-retardant additives; Annals of occupational hygiene; http://cat.inist.fr/?aModele=afficheN&cpsidt-15294107; 2003, vol. 47, No. 8; pp. 653-669; Abstract—2 pages.

Breum, N.O. et al; Cellulosic building insulation versus mineral wool, fiberglass or perlite: Installer's exposure by inhalation of fibers, dust, endotoxin and fire-retardant additives; http://www.ncbi.nlm.nih.gov/pubmed/14602673; Nov. 2003, vol. 47, No. 8; pp. 653-669; abstract—1 page.

The Art of Classifier Selection; Hosokawa Micron; www.hosokawa,co.uk/showpdf/61/The_Art_of_Classifier_Selection.pdf; printed 2009; 3 pages.

* cited by examiner

DEDUSTED FIRE-RETARDANT CELLULOSE MATERIAL

CROSS-REFERENCE TO RELATED APPLICATIONS

This application claims priority to U.S. Provisional Application Ser. No. 61/102,463, filed Oct. 3, 2008.

FIELD OF THE INVENTION

The present invention generally relates to the production of a fire-resistant cellulose insulation product, and more particularly to the manufacture of fire-resistant cellulose insulation materials using a process which exclusively involves liquid fire retardant compositions.

BACKGROUND OF THE INVENTION

Cellulose compositions combined with fire retardant materials are widely used in the construction industry. Specifically, fire-resistant cellulose materials are traditionally used for thermal insulation in the walls and attic spaces of homes and commercial buildings. Insulation products of this type are designed to prevent heat loss and correspondingly insulate building structures from the outside environment. Raw materials used to produce cellulose insulation products may involve many different paper compositions ranging from recycled newspaper to cardboard, paperboard, and fiberboard. These materials are physically processed to produce a finely-divided material having a low bulk density.

To achieve an approved level of flame and smolder resistance, the selected cellulose materials are combined with fire retardant compositions during the production process. Many different fire retardants may be used for this purpose, which are traditionally applied in powder form. Exemplary fire retardant compositions include but are not limited to monoammonium phosphate, diammonium phosphate, boric acid, ammonium sulfate, sodium tetraborate and mixtures thereof. These materials, as well as other fire retardant compositions and additional information regarding the production of cellulose insulation products are discussed in U.S. Pat. No. 4,168,175 to Shutt and U.S. Pat. No. 4,595,414 to Shutt, the disclosures of which are incorporated herein by reference.

After combining the selected fire retardant compositions and cellulose materials, the resulting product is physically processed using conventional mechanical devices (e.g. hammermill systems known in the art) to produce a pulverized, finely divided insulation product. In accordance with traditional processing technology, fire-resistant cellulose insulation products are specifically prepared using one of two basic methods. In a first method, the selected cellulose materials (e.g. recycled/used paper products) are subjected to multi-stage size reduction by grinding or other conventional processes using standard equipment including but not limited to hammermill systems. At selected stages during the size reduction process, a fire retardant composition in powder (dry) form is combined/mixed with the cellulose materials. In a preferred embodiment, mixing of these ingredients is undertaken at or near the final grinding/shredding stages of the system.

Alternative "hybrid-type" systems have been developed which involve addition of fire retardant compositions in powder (dry) form at or near the final size-reduction stages of the system in combination with the use of a liquid fire retardant composition in the initial stages of production. However, both of these systems require the use of powdered (dry) fire retardant compositions which present numerous disadvantages. These disadvantages include but are not limited to (1) the generation of substantial amounts of dust which requires elaborate safety and environmental control systems; (2) the need to use large amounts of chemicals (e.g. fire retardants) due to production inefficiencies associated with powder-type systems; and (3) increased material costs associated with the need to use large quantities of powdered chemicals.

SUMMARY OF THE INVENTION

The present invention involves a unique and distinctive all-liquid fire retardant system that entirely avoids the use of any fire retardants in powdered (dry) form and produces a low-dust fire retardant cellulose insulation material. The present system includes a combination of process steps which efficiently produces a cellulose insulation product in a highly effective manner while avoiding the problems described above. Furthermore, processes of the invention provide numerous important and substantial advantages not attainable by powder-based systems, including but not limited to (1) the substantial elimination of dust problems and the safety considerations/control equipment associated therewith; (2) a substantial reduction in chemical (e.g. fire retardant) use; and (3) a corresponding reduction in material costs due to decreased chemical use. In addition to the foregoing benefits, the final insulation products manufactured in accordance with the invention readily meet all applicable government requirements, and have a lower average bulk density compared with materials produced using powdered fire retardants.

The term "bulk density" as used herein is defined to encompass the weight (traditionally in $lbs.ft^3$) of the final settled insulation product. A final product with a low bulk density is desired because it imparts less weight to the building structure in which it is used. In addition, a final product with low bulk density is more free-flowing, easier to handle, and more readily installed. In addition, since cellulose insulation is typically sold by coverage (i.e., volume), an insulation material with a lower bulk density enables a manufacturer to sell less weight without diminishing performance. Furthermore, the fiber materials in the final or completed product have a higher degree of rigidity which results in less settling of the product when used in a building structure compared with insulation products that are conventionally-prepared using fire retardants in powdered (dry) form. Minimal settling of the insulation product is beneficial because it enables less of the product to be used, thereby providing significant cost savings. The completed insulation product is also characterized by a substantial absence of detached fibrous residue which, if present, can increase its density. Accordingly, the present invention represents an advance in the art of cellulose insulation manufacture, and provides many economic, safety, quality-control, and other benefits compared with powder-based systems as further discussed below.

The invention provides methods for producing a low-dust cellulose fiber material useful in producing insulation and other such products. In embodiments of a method of the invention, a liquid comprising a solvent and at least one fire-retarding material soluble in the solvent, is applied to a cellulose source material. The liquid is allowed to permeate into the cellulose source material. The liquid permeated material is dried to remove the solvent while the fire-retardant material remains in the cellulose source material. The dried cellulose source material is then reduced in size to produce a fire-retardant cellulose fiber material. The fire-retardant cellulose fiber material is then de-dusted to produce a low-dust fire-retardant cellulose fiber material that has functionally equivalent fire-retardant properties as the fire-retardant cellulose fiber material before de-dusting.

BRIEF DESCRIPTION OF THE DRAWINGS

Embodiments of the invention are described below with reference to the following accompanying drawings, which are for illustrative purposes only. Throughout the following views, the reference numerals will be used in the drawings, and the same reference numerals will be used throughout the several views and in the description to indicate same or like parts.

DETAILED DESCRIPTION OF THE PREFERRED EMBODIMENT

The following description with reference to the drawings provides illustrative examples of de-dusted fire-resistant cellulose insulation material and methods according to embodiments of the invention. Such description is for illustrative purposes only and not for purposes of limiting the same.

The present invention provides a unique and highly efficient method for producing a de-dusted, fire-resistant cellulose (e.g., paper-based) insulation product. The present methods achieve the above-described benefits, at least in part, through the use of fire retardant compositions that are exclusively liquid with a total absence of a powder-type fire retardant, for example, conventional powder-type fire retardants such as those described in U.S. Pat. No. 4,168,175 and U.S. Pat. No. 4,595,414 (Shutt). As such, the present methods avoid the use of powdered (dry) fire retardant compositions.

To manufacture a fire-resistant cellulose insulation product utilizing an all-liquid system, embodiments of the present invention are characterized by a combination of unique processing steps which enable the correct amount of liquid fire retardant compositions to be diffused within the selected cellulose materials, permit complete drying of the cellulose materials while producing minimal amounts of fine fibrous residue and removal of a majority to substantially all dust from the dried and size-reduced fire-resistant cellulose insulation product.

Figure 1:
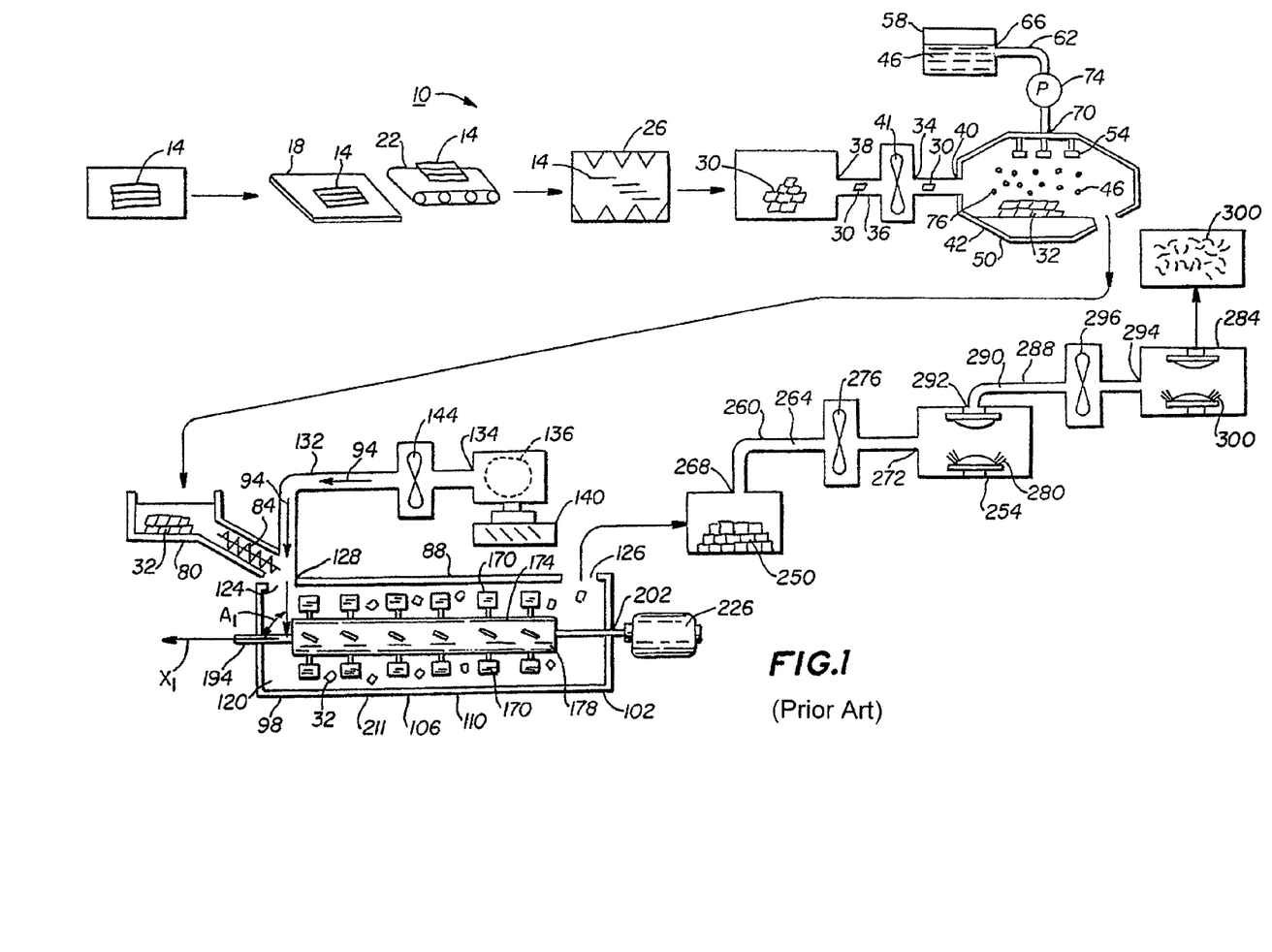
FIG. 1 is a schematic illustration of an embodiment of a conventional processing system for producing a fire-resistant cellulose insulation material through the application of liquid fire-retardant compositions to cellulose materials.

Processes for applying liquid fire-retardant compositions to cellulose materials are known in the art. FIG. 1 provides a schematic illustration of an embodiment of a processing system 10 with process steps and equipment for producing a fire-resistant cellulose insulation product through the application of a liquid fire-retardant composition to cellulose material as described in U.S. Pat. No. 5,534,301, the disclosure of which is incorporated in its entirety herein.

As illustrated, a supply of cellulose material 14 is initially provided. The cellulose material 14 will basically involve vegetable fiber materials, wood fiber compositions, or any other cellulosic substrates which are known in the art for producing insulation materials. Preferably, the supply of cellulose material 14 will consist of virgin (unused) or recycled (used) paper, with the term "paper" encompassing commercial products derived from wood or other plant materials ranging from newspaper to cardboard, fiberboard, and paperboard. However, the present invention shall not be limited to any particular paper or cellulose compositions, with a variety of different materials being suitable for use in the system 10. In a preferred embodiment, paper is used as the supply of cellulose material. The term "paper" as used herein shall encompass a wide variety of vegetable or wood-based fiber materials ranging from conventional paper products to cardboard, fiberboard, and the like. Furthermore, the selected paper materials can include virgin (unused) products or, in a preferred embodiment, recycled paper. An exemplary and preferred product suitable for processing in accordance with the invention involves recycled (used) newspaper (optimally "grade 8" newspaper).

The selected supply of cellulose material 14 (e.g. recycled newspaper, Kraft paper, etc.) is then loaded onto a platform such as a feed table 18 where the material 14 is sorted and separated from non-cellulose materials and other materials. The cellulose material 14 can then be routed via a conveyer belt system 22, for example, into a shredding and/or grinding apparatus 26 to physically reduce the size of the material to a desired level and produce a plurality of individual pieces of paper 30 which, in a preferred embodiment, have an average width and length of about 2-6 inches (about 5-15 cm). While these numerical values are preferred for use in the claimed process, the present invention shall not be limited to the foregoing numerical parameters which are provided solely as an example. The precise paper size to be used at this stage of the process can be determined in accordance with preliminary pilot studies on the paper material being processed and treated.

The individual pieces of paper 30 are then transferred from the shredding apparatus 26 into an air transport system 34 as known and used in the art for material transfer, which uses an air flow to move the pieces of paper to the next stage of the system 10, i.e., a spraying system 42. A conventional spraying apparatus such as a standard spray booth 50 can be utilized. The spraying system is designed to deliver at least one liquid fire retardant composition 46 to the pieces of paper 30, and can include one or more spraying nozzles 54 connected to a tank 58 containing the selected liquid fire retardant composition. Within the spraying system 42 (e.g., spray booth 50), the pieces of paper 30 are converted into a fire retardant-soaked paper product 32, which comprises the initial pieces of paper 30 soaked with the liquid fire retardant composition 46.

To ensure proper and complete diffusion of the liquid fire retardant composition within the paper, the liquid fire retardant composition 46 is optimally delivered to the paper materials 30 in the form of a fine mist comprising a plurality of droplets each having a diameter of about 40-200 microns. Using this approach, the selected fire retardant composition 46 can adequately and completely diffuse into the fibrous matrix of the paper 30. Spraying of the liquid fire retardant composition 46 in a fine mist provides many benefits including but not limited to (1) a reduction in the amount of liquid fire retardant composition 46 that is needed; (2) greater dispersion of the composition 46 within the internal fibrous matrix of the paper 30; and (3) a lack of chemical fire retardant dust in the final product as discussed below.

Any liquid-soluble fire retardant chemical can be used which is capable of imparting fire resistance to the selected cellulose materials. For example, a variety of fire retardant compounds which may be used in solution form as the liquid fire retardant composition 46 are listed in U.S. Pat. No. 4,595,414 and U.S. Pat. No. 4,168,175 (Shutt), the disclosure of which is incorporated herein by reference. For example, aqueous solutions of the following compounds may be used as the liquid fire retardant composition: ammonium sulfate, monoammonium phosphate, diammonium phosphate, boric acid, sodium tetraborate, ferrous sulfate, zinc sulfate, and mixtures thereof. Examples of fire retardant materials/mixtures include ammonium sulfate (alone), a mixture of about 93.7% wt. ammonium sulfate and about 6.3% wt. boric acid, and a mixture of about 40% wt. monoammonium phosphate and about 60% wt diammonium phosphate, which are ultimately combined with water to produce aqueous solutions.

Solutions of many different fire retardant chemicals can be used in the described process, with the present invention not being limited to any particular agents or combinations thereof. The selected fire retardant composition 46 will typically be formulated as an aqueous solution, preferably having about 35-42% by weight total of one or more fire retardant compounds dissolved therein. Application of the liquid fire retardant composition 46 will typically produce a fire retardant-soaked paper product 32 which (prior to drying) will contain about 12.5-30% by weight fire retardant composition 46. Upon drying, the dried insulation product will typically contain about 5-12% by weight of the selected fire retardant compound(s) which were applied in solution form. The compositions 46 can further include one or more optional additives such as a wetting agent.

Additionally, fire-retardants in which the solvent is not water (e.g., an organic solvent), are considered within the scope of this invention. Of course, non-aqueous solvents will require suitable equipment and safety measures.

Referring to FIG. 1, the fire retardant-soaked paper product 32 is then transferred into a drying chamber 88 along with a stream of heated air (designated by arrows 94). However, between the application of a selected liquid fire retardant composition to the paper and passage of the fire retardant-soaked paper product into the drying chamber 88, a given amount of "dwell" (delay) time period is allowed to lapse. A sufficient amount of dwell time ensures complete diffusion of the liquid fire retardant composition 46 into the interior regions of the pieces of paper 30. In a preferred embodiment, a dwell time period of about 45-120 seconds will be allowed to lapse after application of the liquid fire retardant composition 46 to the paper materials, with the exact time period depending on the type of paper being employed and other experimentally-determined factors.

The imposition of dwell time at this stage in the system can be accomplished in many ways, with the present invention not being limited to any particular method. For example, prior to passage of the fire retardant-soaked paper product 32 into the drying chamber 88, the paper product 32 can be allowed to reside in one or more stationary hoppers 80 or containment vessels for a selected amount of time. Likewise, after production of the fire retardant-soaked paper product 32, the paper product can be conveyed to subsequent parts of the processing system 10 using conventional transfer systems (e.g., feed screws, conveyor belts, and the like) which are operated at a controlled rate of speed to impart a delay in moving the paper product 32 through the system 10. This procedure may be employed with or without the use of stationary hoppers 80 to provide a sufficient degree of dwell time.

Prior to or simultaneously with the entry of paper product 32 into the drying chamber 88, a stream of heated air (designated by arrows 94) is passed into and through the drying chamber 88. The stream of heated air 94 is designed to simultaneously move and dry the paper product 32 within the chamber 88. In a preferred embodiment, the drying chamber 88 is circular in cross-section and tubular in design with a longitudinal axis $X_1$ therethrough.

To achieve optimum drying of the fire retardant-soaked paper product 32 within the drying chamber 88, it is preferred that the stream of heated air 94 is introduced (delivered) into the drying chamber in an angled and non-parallel orientation relative to the longitudinal axis $X_1$ of the drying chamber 88, designed as $A_1$ in FIG. 1. The angle $A_1$ of air introduction will preferably be about 90° relative to the longitudinal axis $X_1$ of the drying chamber 88 so that the stream of heated air 94 enters the drying chamber 88 in a direction which is perpendicular to the longitudinal axis $X_1$ of the chamber 88. However, depending on the particular configuration of the system 10, the angle $A_1$ of air introduction relative to the longitudinal axis $X_1$ of the drying chamber 88 can range from about 60°-90°, with about 90° being preferred. It is also preferred that the stream of heated air 94 be introduced in a manner wherein the stream is laterally offset from (e.g. to the side of) the longitudinal axis $X_1$ of the drying chamber 88. As a result, the stream of heated air 94 entering the drying chamber 88 will travel in a substantially helical pathway around and along the circular interior surface of the chamber wall which slows the movement of paper product 32 passing through the chamber 88. In a preferred embodiment, the stream of heated air 94 is introduced into the chamber at a flow rate of about 2500-3500 ft./min. (which may be varied as necessary in accordance with preliminary pilot studies on the materials being processed).

The fire retardant-soaked paper product 32 is passed into and through the drying chamber 88 in combination with the stream of heated air 94 after completion of the dwell time period. The stream of heated air 94 is designed to simultaneously move the paper product 32 through the drying chamber 88 to achieve complete drying of the paper product 32 within the chamber. However, to properly implement the all-liquid fire retardant system of the present invention, an additional amount of dwell time can be imparted to the paper product 32 within the drying chamber 88 to ensure that the paper product 32 is completely dried. If the paper product 32 is allowed to flow through the drying chamber 88 with the stream of heated air 94 in an uninterrupted manner, the paper product 32 may not be completely dry upon leaving the chamber 88. Although introduction of the heated air 94 in a helical flow path causes the paper product 32 to pass through the chamber 88 at a slower rate (compared with a linear flow path), additional dwell time may be needed to ensure complete drying.

To completely dry the fire retardant-soaked paper product 32, the process involves temporarily interrupting passage of the fire retardant-soaked paper product and heated air 94 through the drying chamber 88 periodically (e.g., at least once and preferably multiple times) during movement of these components through the drying chamber 88. This step slows the flow of the paper product 32 and heated air 94 through the drying chamber 88, which enables greater contact between the heated air 94 and paper product 32. Since interruption of these components is temporary and periodic (e.g., at selected intervals), once the paper product 32 and air 94 begin moving again after being interrupted, the stream of air 94 accelerates faster than the paper product 32. This occurs because the air 94 is lighter and less dense than the paper product 32. As a result, the stream of heated air 94 flows over the surface of the slower-moving paper product 32, causing more intimate contact and increased drying of the paper product. In this regard, the more interruptions of the foregoing paper product 32 and the air 94, the greater the drying capacity of the system 10. Without temporarily and periodically interrupting (e.g. slowing) the foregoing components as they move through the drying chamber 88, an inadequately-dried material would be generated. As a result of the above-described process, a dried fire-resistant cellulose insulation product is generated within the drying chamber 88.

There are numerous ways to temporarily and periodically interrupt the flow path of the fire retardant-soaked paper product 32 and the stream of heated air 94 as they pass through the drying chamber 88. Accordingly, the present invention shall not be limited to any particular method or apparatus for this purpose. In a preferred embodiment, temporary interruption of the paper product 32 and air 94 as they flow through the drying chamber 88 can be accomplished through the use of a chamber which includes one or more stationary or movable baffle members 170 therein. In a preferred embodiment, the drying chamber 88 includes moveable (e.g. rotatable) baffle members that are continuously moved within the drying chamber during passage of the heated air and paper product therethrough. As a result, the paper product 32 passing through the drying chamber 88 comes in contact with (e.g. physically engages) at least one and preferably multiple baffle members during movement of the baffle members within the chamber. Engagement of the paper product 32 with the baffle members temporarily interrupts the transportation and flow of the paper product 32 through the drying chamber. The same situation occurs regarding the stream of heated air 94 as it moves through the drying chamber 88. As a result, passage of the paper product 32 through the drying chamber 88 is substantially slowed (compared with a chamber which lacks any baffle members therein). While a delay also occurs regarding the stream of air 94 as it encounters the baffle members and moves through the chamber 88, this delay is less compared with the paper product 32 due to the minimal weight and density of air 94. This process in which the paper product 32 experiences a greater degree of delay or "dwell" (delay) time within the chamber 88 compared with the stream of heated air 94 enables a more continuous and sustained level of air flow over and in contact with the paper product 32. As a result, the paper product 32 is completely dried so that an adequately dried fire-resistant cellulose insulation product can be produced within the drying chamber.

After passage of the paper product 32 through the drying chamber 88, it exits the chamber 88 via outlet port 126 (FIG. 1). Within the chamber 88, drying of the paper product 32 produces a dried fire-resistant cellulose insulation product 250 which is collected from the chamber 88 and further processed as desired to create a final product with additional size reduction and specific size characteristics. Size reduction can be accomplished, for example, using one or more hammermill units 254, 284, or other comparable systems known in the art for this purpose, to produce a size-reduced insulation product 280, e.g., in which each piece of paper in the product 280 has a length and width of about 0.25-1 inch (about 0.6-2.5 cm), and 'completed' insulation product 300 having the desired size of the product, e.g., in which each piece of paper in the product 300 has a length and width of about 0.01-0.2 inch (about 0.025-0.5 cm).

The size reduction processing to produce the dried fire-resistant cellulose insulation product 300 typically produces a substantial quantity of dust (i.e., material with very small particle size), which contains residues and chemicals that can be easily inhaled. Although the dust that is generated is generally about 10% less than the amount produced in powder-type fire-retardant systems, the amount of dust associated with the dried product 300 can pose significant problems such as lack of visibility and personal nuisance due to a high amount of air-borne dust particles when the material is applied as an insulation, particularly for people with sinus, asthma and other respiratory problems. The inventor has discovered that, unlike known processes in this art, the current material can be processed to eliminate a major amount (i.e., at least 50% by volume or more) to substantially all (i.e., about 90-100% by volume) of the dust.

Figure 2:
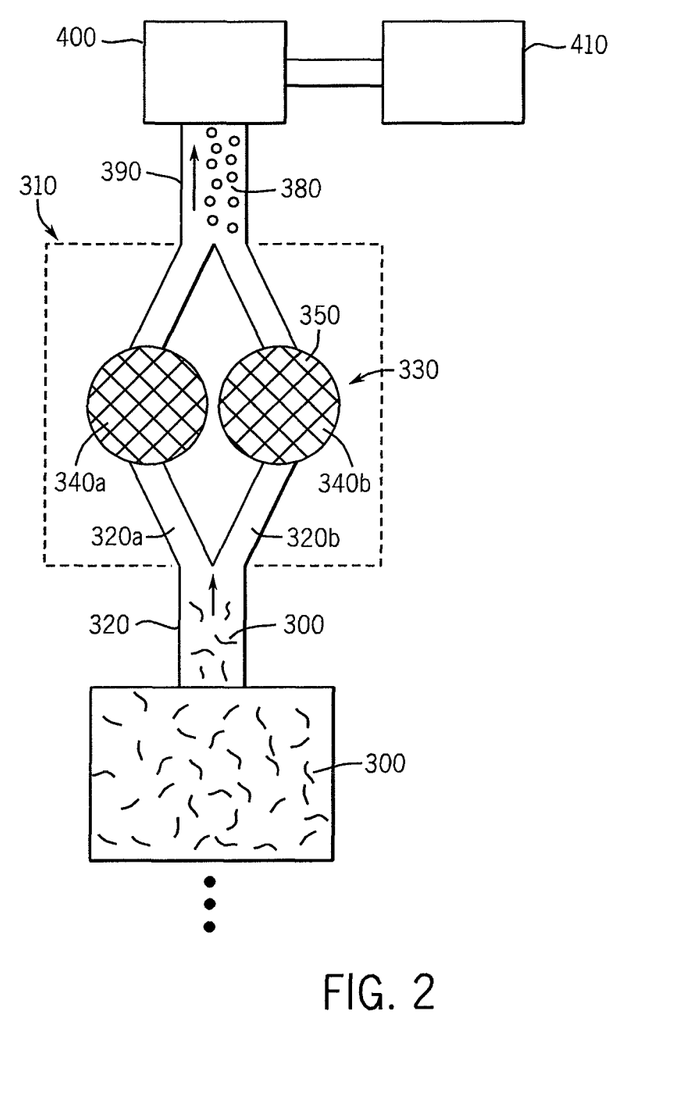
FIG. 2 is a schematic illustration of process steps, materials, and procedures following the process illustrated in FIG. 1, associated with the production of a de-dusted, fire-resistant cellulose insulation material according to an embodiment of the present disclosure.
Figure 3:
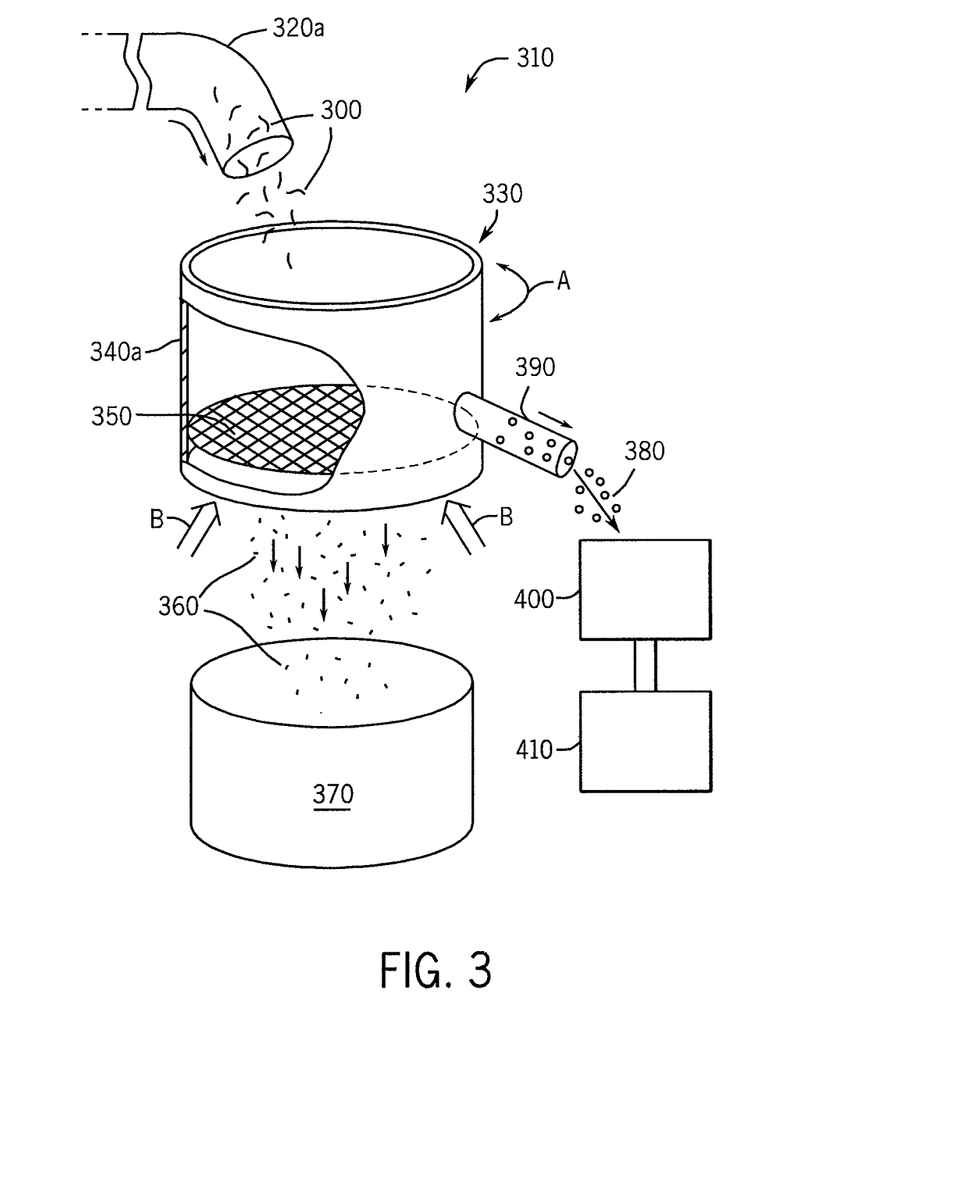
FIG. 3 illustrates an embodiment of a de-dusting apparatus composed of a screen unit.

Referring now to FIGS. 2-3, according to the invention, after processing to reduce the size of the dried paper material, the completed, size reduced insulation product 300 is subjected to a dust removal (de-dusting) process 310. The de-dusting can be performed by any suitable process, for example, by screening, air classification, or other known separation techniques. Preferably, the de-dusting is performed by a screening technique or screening in combination with another separation technique.

In embodiments of a de-dusting process 310, the dried insulation product 300 can be conveyed, for example by means of a conduit or chute 320 to a screening apparatus 330. The screening apparatus 330 is composed of one or more screen (sieve) units 340$a,b$ and structured to process a desired quantity of the dried insulation product 300.

Preferably, the screening apparatus 330 is operable to maintain movement of the dried insulation product 300 on and across the mesh screen 350 of the screen unit 340$a,b$ to increase the percentage of dust that is removed. The screening apparatus can be structured and operable to provide such movement of the material on the screen, for example, by rotating, vibrating, or other motion mechanism (arrow 'A') as shown in FIG. 3, or by use of an air supply to apply pulsed air or a gentle air stream underneath the material on the screen (arrow "B") to sweep, brush or vibrate the material 300.

The contact parts of the screen unit 340, including the mesh screen 350, are composed of a material that is chemically compatible with the dried insulation product 300, for example, a stainless steel or nylon. The screen 350 has a mesh size that is suitable for effectively separating a sufficient amount of dust from the dried insulation product 300, preferably to produce a substantially dust-free material by removing at least about 50% by volume of the dust content of the dried insulation product 300, more preferably at least about 70-100% by volume of the dust, and more preferably about 90-100% by volume of the dust. The mesh of the screen can range from about 200 mesh to about 10 mesh, and is preferably about 40 mesh to about 14 mesh, more preferably about 30 mesh to about 20 mesh.

The screen units 340 are structured to provide a high throughput rate and process a high capacity or volume of dried insulation product 300 in a suitable time period, preferably at about 1000 lbs/hour per unit, and more preferably at about 2000 lbs/hour per unit. Depending on the volume and the character of the material 300 being processed, one or more screen units 340 can be used. For example, as depicted in FIG. 2, two or more screen units 340$a,b$ can be set up in a side-by-side arrangement, or in a spoke-type arrangement, etc., with each screen unit connected to a conduit 320$a,b$ for transfer of the dried insulation product 300 into the screen unit. In addition, to process a high volume of dried insulation product 300, a wide diameter screen can be used, for example, having a diameter ranging from about 30" (76 cm) to about 60" (152 cm) or greater. Screen units 340 can used singly or can be stacked.

An example of a suitable screening apparatus 330 for use in the de-dusting process 310 of the invention is a gyratory (vibratory), high capacity, production separator or sieve (e.g., Models VS0048 (single deck) and VS0060 (double deck)), available commercially from VORTI-SIV®, a division of Industries, Inc., Salem, Ohio U.S.A.

As depicted in FIG. 3, the waste dust material 360 will pass through the open mesh screening 350 of the screening unit and into a collection unit 370 (e.g., a bin, etc.) for disposal.

In general, dust material is finely divided solid particles that can be readily suspended in the air and/or remain suspended in the air for a time after the bulk material has substantially settled. Typically, in a cellulose insulation product that has been processed using a dry powder fire-retardant chemical, the reduced size dry product will contain about 14-26% by weight dust based on the total weight of the material, composed of about 10-20% by weight of cellulose-based (e.g., paper) dust and about 4-6% by weight of fire-retardant dry chemical dust. Consequently, de-dusting of a reduced-size cellulose insulation product processed using a dry powder fire-retardant chemical removes a significant amount of fire-retardant chemical material from the product resulting in a product that does not meet federal or industry standards for a fire-retardant material.

By comparison, the inventor has found that for a cellulose insulation product that has been processed using a liquid fire-retardant chemical, the reduced-size dry product will typically contain about 8-15% by weight dust composed of about 7.5-15% by weight cellulose-based (e.g., paper) dust with about 0.5-1.5% by weight of fire-retardant chemical adhered to the dust, and de-dusting according to the invention can remove a substantial amount of dust (up to 100% of the dust) from the reduced-size dry product with substantially no loss of fire-retardant properties.

Following dust removal, the de-dusted, fire retardant dried insulation product 380, can then be conveyed from the screening apparatus 330, for example, through a conduit or chute 390 to a bale press or baler 400 or to a bagging apparatus 410, as known and used in the art, and packaged for transport and future use. In use, the de-dusted, fire retardant dried insulation product 380 can be placed into a hopper and mechanically fluffed up, and then "blown" in place directly into an attic, into stud spaces in an existing wall, and other applications.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations that operate according to the principles of the invention as described. Therefore, it is intended that this invention be limited only by the claims and the equivalents thereof. The disclosures of patents, references and publications cited in the application are incorporated by reference herein.

What is claimed is:

1. A method of producing a low-dust, fire-retardant cellulose fiber material, comprising:
    applying a liquid comprising a solvent and at least one fire-retardant material soluble in the solvent to a cellulose source material;
    allowing the liquid to permeate into the cellulose source material to form a liquid-permeated cellulose material;
    drying the liquid-permeated cellulose material to remove the solvent, wherein an effective amount of the fire-retardant material remains in the cellulose source material, to form a dried, fire-retardant cellulose material;
    reducing the dried, fire-retardant cellulose material in size to produce a reduced-size, dry fire-retardant cellulose fiber material comprising cellulosic dust material comprising the fire retardant material absorbed in and adhered to the dust material; and
    removing a major amount of said dust material from the reduced size, dry fire-retardant cellulose fiber material by screening the cellulose fiber material to produce the low-dust, fire-retardant cellulose fiber material,
    wherein
    the entirety of the screened cellulose fiber material and the dust material comprise a higher amount of the fire retardant material than solely the screened cellulose fiber material, and
    the entirety of the screened cellulose fiber material and the dust material has about the same level of fire retardant properties as only the screened cellulose fiber material to meet federal standards for fire-retardant insulation material.

2. The method of claim 1, wherein at least about 50% by volume of the dust material is removed.

3. The method of claim 1, wherein about 70-100% by volume of the dust material is removed.

4. The method of claim 1, wherein about 90-100% by volume of the dust material is removed.

5. The method of claim 1, wherein removing the dust material comprises separating the reduced size, dry fire-retardant cellulose fiber material from the dust material using a device having a screen and operable to cause movement of the cellulose fiber material on the screen.

6. The method of claim 5, wherein the screen has a mesh ranging from about 14 mesh to about 200 mesh.

7. The method of claim 5, comprising applying air to the reduced size, dry fire-retardant cellulose fiber material on the screen to cause movement of said material.

8. The method of claim 5, comprising moving the screen device or an element thereof to cause movement of the reduced size, dry fire-retardant cellulose fiber material.

9. The method of claim 8, wherein moving the screen device or element thereof comprises rotating the screen device or vibrating the screen device or element thereof.

10. A method of producing a low-dust, fire-retardant cellulosic material, comprising:
    applying a liquid composition comprising a solvent and at least one fire-retardant material, to wet a cellulosic material;
    drying the wetted cellulosic material to form a dried, fire-retardant cellulosic material;
    reducing the dried, fire-retardant cellulosic material in size to produce a reduced-size, fire-retardant cellulosic material comprising cellulosic dust material comprising fire retardant material absorbed in and adhered to the dust material; and
    screening the reduced size, fire-retardant cellulosic material to remove a major amount of said dust material and produce the low-dust, fire-retardant cellulosic material,
    wherein
    the entirety of the screened cellulosic material and the dust material comprise a higher amount of the fire retardant material than solely the screened cellulosic material, and
    the entirety of the screened cellulosic material and the dust material has about the same level of fire retardant properties as only the screened cellulosic material to meet federal standards for fire-retardant insulation material.

11. The method of claim 10, further comprising, after applying the liquid composition, allowing a period of time to elapse before drying the cellulosic material.

12. The method of claim 11, wherein the period of time is 45 to 120 seconds.

13. A method of producing a low-dust, fire-retardant cellulose fiber material, comprising:
    applying a liquid fire-retardant material to a cellulose source material to form a liquid-permeated cellulose material;

drying the liquid-permeated cellulose material to form a dried, fire-retardant cellulose material;

reducing the dried, fire-retardant cellulose material in size to produce a reduced-size, dry fire-retardant cellulose fiber material comprising cellulosic dust material comprising the fire retardant material absorbed in and adhered to the dust material; and screening the cellulose fiber material to remove at least 50% by volume of said dust material to produce the low-dust, fire-retardant cellulose fiber material wherein the entirety of the screened cellulose fiber material and the dust material comprise a higher amount of the fire retardant material than solely the screened cellulose fiber material, and the entirety of the screened cellulose fiber material and the dust material has about the same level of fire retardant properties as only the screened cellulose fiber material to meet federal standards for fire-retardant insulation material.

14. The method of claim 13, wherein the reduced-size, dry fire-retardant cellulose fiber material comprises 8-15 wt % cellulosic dust material.

\* \* \* \* \*